US011629618B2

(12) United States Patent
Drouvot et al.

(10) Patent No.: US 11,629,618 B2
(45) Date of Patent: Apr. 18, 2023

(54) COMBINED CYCLE POWER PLANT HAVING SERIAL HEAT EXCHANGERS

(71) Applicant: General Electric Company, Schenectady, NY (US)

(72) Inventors: Paul Pierre Antoine Drouvot, Village-Neuf (FR); Brian M. Gallagher, Simpsonville, SC (US); Douglas F. Beadie, Greer, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/403,101

(22) Filed: Aug. 16, 2021

(65) Prior Publication Data

US 2022/0325639 A1   Oct. 13, 2022

(30) Foreign Application Priority Data

Apr. 8, 2021   (EP) .................................. 21315061

(51) Int. Cl.
*F01K 23/10* (2006.01)
*F02C 7/16* (2006.01)

(52) U.S. Cl.
CPC ................ *F01K 23/10* (2013.01); *F02C 7/16* (2013.01); *F05D 2220/32* (2013.01); *F05D 2220/72* (2013.01)

(58) Field of Classification Search
CPC ........ F01K 23/10; F02C 7/16; F05D 2220/32; F05D 2220/72
See application file for complete search history.

(56) References Cited

U.S. PATENT DOCUMENTS 10,006,313 B2   6/2018   Drouvot et al.
2002/0144505 A1*  10/2002   Sonoda ................. F01K 23/106
                                                                60/618

(Continued)

FOREIGN PATENT DOCUMENTS

EP   1205641 A2   5/2002
EP   2541021 A2   1/2013

OTHER PUBLICATIONS

European Search Report Corresponding to Application No. 21315061 dated Nov. 15, 2021.

(Continued)

*Primary Examiner* — Jesse S Bogue
(74) *Attorney, Agent, or Firm* — Dority & Manning, P.A.

(57) ABSTRACT

A gas turbine system includes a compressor section, a turbine section, a combustor section. The combustor section is in fluid communication with a fuel supply via a fuel supply line. The water circuit includes a first water line extending between a first feed water supply line and a return water line. The gas turbine system further includes an extraction-air line that extends between an inlet port on the compressor section and an outlet port on the turbine section. A first heat exchanger thermally couples the first water line to the extraction-air line for transferring heat from a flow of extraction-air within the extraction-air line to a flow of water within the water circuit. A second heat exchanger thermally couples the first water line to the fuel supply line for transferring heat from the flow of water within the water circuit to a flow of fuel within the fuel supply line.

18 Claims, 3 Drawing Sheets

(56) References Cited

U.S. PATENT DOCUMENTS

| | | | |
|---|---|---|---|
| 2003/0037534 A1* | 2/2003 | Sugishita | F01K 23/106 60/39.182 |
| 2015/0007575 A1* | 1/2015 | Drouvot | F02C 7/224 60/39.182 |
| 2015/0322822 A1* | 11/2015 | Khandwavla | F02C 9/40 60/39.19 |
| 2018/0363557 A1 | 12/2018 | Sumimura et al. | |
| 2020/0332681 A1* | 10/2020 | Uechi | F01K 23/101 |
| 2022/0099021 A1* | 3/2022 | Uechi | C01B 3/04 |

OTHER PUBLICATIONS

European Search Report Corresponding to Application No. 21315061.8-1002 dated Nov. 15, 2021.

* cited by examiner

COMBINED CYCLE POWER PLANT HAVING SERIAL HEAT EXCHANGERS

CROSS-REFERENCE TO RELATED APPLICATIONS

This application claims the benefit of priority to French Patent Application No. 21315061.8, filed on Apr. 8, 2021, the disclosure of which is incorporated by reference herein in its entirety.

FIELD

The present disclosure relates generally to gas turbine systems fluid heat exchangers. In particular, the present disclosure relates to gas turbine systems having heat exchangers that both heat fuel and cool compressed air.

BACKGROUND

A gas turbine power plant such as a combined cycle power plant (CCPP) generally includes a gas turbine having a compressor section, a combustor section, a turbine section, a heat recovery steam generator (HRSG) that is disposed downstream from the turbine and at least one steam turbine in fluid communication with the HRSG. During operation, air enters the compressor via an inlet system and is progressively compressed as it is routed towards a compressor discharge or diffuser casing that at least partially surrounds the combustor. At least a portion of the compressed air is mixed with a fuel and burned within a combustion chamber defined within the combustor, thereby generating high temperature and high pressure combustion gas.

The combustion gas is routed along a hot gas path from the combustor through the turbine where they progressively expand as they flow across alternating stages of stationary vanes and rotatable turbine blades which are coupled to a rotor shaft. Kinetic energy is transferred from the combustion gas to the turbine blades thus causing the rotor shaft to rotate. The rotational energy of the rotor shaft may be converted to electrical energy via a generator. The combustion gas exits the turbine as exhaust gas and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

One or more heat exchangers may be used for preheating the fuel prior to mixing with compressed air, which results in hotter combustion gases capable of generating more energy within the turbine section. Additionally, due to the high temperature of the combustion gases, relatively cool air is often extracted from the compressor section and routed to the turbine section for cooling the various hot gas path components of the turbine section. As would be appreciated, the hotter the fuel is prior to being introduced to the combustor section, and the colder the extraction air is prior to use in the turbine section, the more efficient the gas turbine system will be.

Accordingly, an improved gas turbine system that advantageously provides for cooler extraction compressed air and hotter fuel is desired in the art.

BRIEF DESCRIPTION

Aspects and advantages of the gas turbine systems and combined cycle power plants in accordance with the present disclosure will be set forth in part in the following description, or may be obvious from the description, or may be learned through practice of the technology.

In accordance with one embodiment, a gas turbine system is provided. The gas turbine system includes a compressor section, a turbine section, a combustor section. The combustor section is disposed downstream from the compressor section and upstream from the turbine section. The combustor section is in fluid communication with a fuel supply via a fuel supply line. The gas turbine system further includes a water circuit that is fluidly coupled to, and extends between, a first feed water supply line and a return water line. The water circuit includes a first water line extending between the first feed water supply line and the return water line. The gas turbine system further includes an extraction-air line that extends between an inlet port on the compressor section and an outlet port on the turbine section. A first heat exchanger thermally couples the first water line to the extraction-air line for transferring heat from a flow of extraction-air within the extraction-air line to a flow of water within the water circuit. A second heat exchanger thermally couples the first water line to the fuel supply line for transferring heat from the flow of water within the water circuit to a flow of fuel within the fuel supply line.

In accordance with another embodiment, a combined cycle power plant (CCPP) is provided. The CCPP includes a gas turbine system, at least one steam turbine, and a heat recovery steam generator (HRSG). the HRSG includes a high-pressure economizer (HPECON), a first feed water supply line extends from an outlet of the HPECON and out of the HRSG. The gas turbine system includes a compressor section, a turbine section, a combustor section. The combustor section is disposed downstream from the compressor section and upstream from the turbine section. The combustor section is in fluid communication with a fuel supply via a fuel supply line. The gas turbine system further includes a water circuit that is fluidly coupled to, and extends between, a first feed water supply line and a return water line. The water circuit includes a first water line extending between the first feed water supply line and the return water line. The gas turbine system further includes an extraction-air line that extends between an inlet port on the compressor section and an outlet port on the turbine section. A first heat exchanger thermally couples the first water line to the extraction-air line for transferring heat from a flow of extraction-air within the extraction-air line to a flow of water within the water circuit. A second heat exchanger thermally couples the first water line to the fuel supply line for transferring heat from the flow of water within the water circuit to a flow of fuel within the fuel supply line.

These and other features, aspects and advantages of the present gas turbine systems and combined cycle power plants will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present gas turbine systems and combined cycle power plants, including the best mode of making and using the present systems and methods, directed to one of ordinary skill in the art, is set forth in the specification, which makes reference to the appended figures, in which.

DETAILED DESCRIPTION

Figure 1:
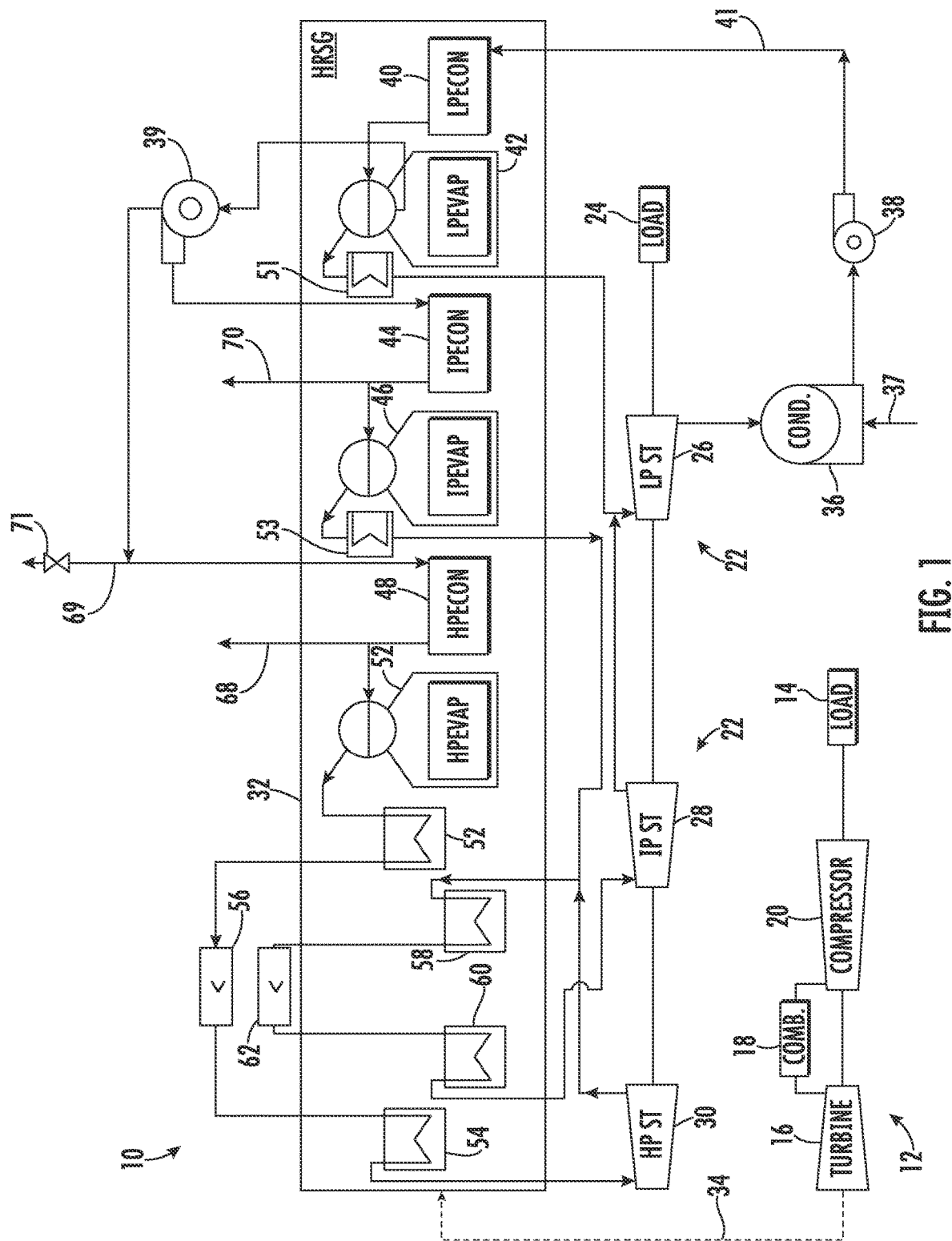
FIG. 1 is a schematic illustration of a combined cycle power plant (CCPP), in accordance with embodiments of the present disclosure.

Reference now will be made in detail to embodiments of the present gas turbine systems and combined cycle power plants, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," "approximately," "substantially," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

FIG. 1 is a schematic flow diagram of an embodiment of a combined cycle power generation system or combined cycle power plant (CCPP) 10. The CCPP 10 may include a gas turbine 12 for driving a first load 14. The first load 14 may, for instance, be an electrical generator for producing electrical power. The gas turbine 12 may include a turbine section 16, combustion section or a combustion chamber 18, and a compressor section 20. The turbine section 16 and the compressor section may be connected by one or more shafts 21.

During operation, a working fluid such as air flows into the compressor section 20 where the air is progressively compressed, thus providing compressed air to the combustion section 18. The compressed is mixed with fuel and burned within each combustor to produce combustion gases. The combustion gases flow through the hot gas path from the combustion section 18 into the turbine section 16, wherein energy (kinetic and/or thermal) is transferred from the combustion gases to the rotor blades, causing the one or more shafts 21 to rotate. The mechanical rotational energy may then be used to power the compressor section 20 and/or to generate electricity. Heated exhaust gas 34 exiting the turbine section 16 may then be exhausted from the gas turbine 12 via an exhaust section.

The CCPP 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The CCPP 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) or/and towards a pump 39. The pump 39 may be operable to direct condensate from the LPEVAP towards either or both of an intermediate-pressure economizer 44 (IPECON) or a high-pressure economizer 48 (HPECON) at different pressures. Additionally, as described below, the pump 39 may be operable to direct, via a feedwaterwater supply line 69, a portion of the condensate from the LPECON 40 towards the water circuit 108 of the gas turbine system 100. Steam from the low-pressure evaporator 42 may be directed into a low-pressure superheater 51 and eventually sent to the low-pressure section 26 of the steam turbine 22. Likewise, from the intermediate-pressure economizer 44, the condensate may be directed into an intermediate-pressure evaporator 46 (IPEVAP). In addition, water from the intermediate-pressure economizer 44 may be sent to a one or more fuel heat exchangers where the water may be used to heat fuel gas for use in the combustion section 18 of the gas turbine 12. Steam exiting the intermediate-pressure evaporator 46 may be directed into an intermediate-pressure superheater 53, followed by primary re-heater 58 and a secondary re-heater 60 where the steam is superheated and eventually sent to the intermediate-pressure section 28 of the steam turbine. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPE-VAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as CCPP 10, hot exhaust may flow from the gas turbine 12 and pass through the HRSG 32 and may be used to generate high-pressure, high-temperature steam, as well as high-temperature water. The steam produced by the HRSG 32 may then be passed through the steam turbine 22 for power generation. In addition, the produced steam may also be supplied to any other processes where superheated steam may be used.

The gas turbine 12 generation cycle is often referred to as the "topping cycle," whereas the steam turbine 22 generation cycle is often referred to as the "bottoming cycle." By combining these two cycles as illustrated in FIG. 1, the combined cycle power plant 10 may lead to greater efficiencies in both cycles. In particular, exhaust heat from the topping cycle may be captured and used to generate steam for use in the bottoming cycle.

The CCPP 10 advantageously recaptures heat from the heated exhaust gas 34 by using the HRSG 32. As illustrated in FIG. 1, components of the gas turbine 12 and the HRSG 32 may be separated into discrete functional units. In other words, the gas turbine 12 may generate the heated exhaust gas 34 and direct the heated exhaust gas 34 toward the HRSG 32, which may be primarily responsible for recapturing the heat from the heated exhaust gas 34 by generating superheated steam. In turn, the superheated steam may be used by the steam turbine 22 as a source of power. The heated exhaust gas 34 may be transferred to the HRSG 32 through a series of ductwork, which may vary based on the particular design of the CCPP 10.

Figure 2:
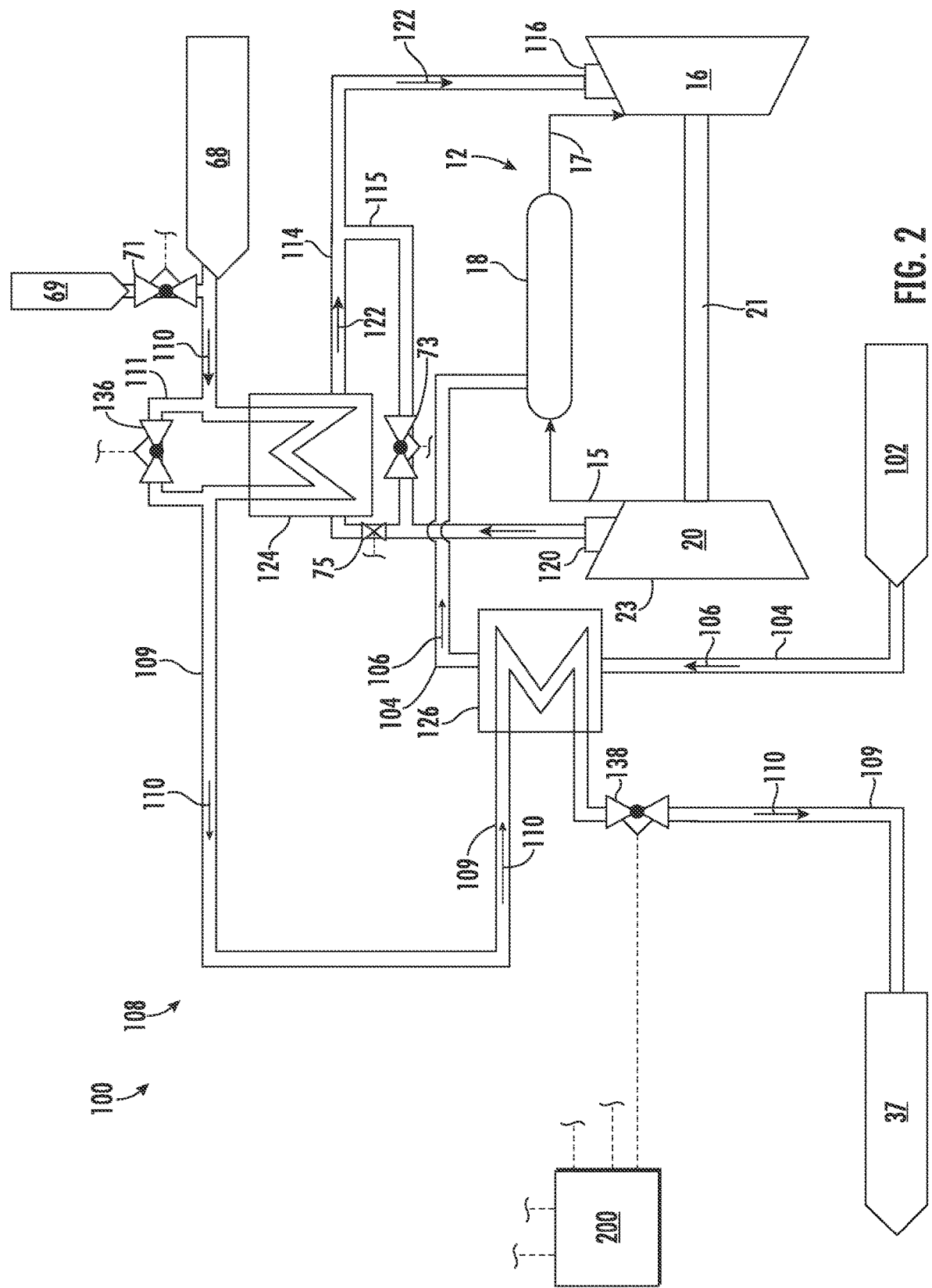
FIG. 2 illustrates a schematic view of a gas turbine system, in accordance with embodiments of the present disclosure.
Figure 3:
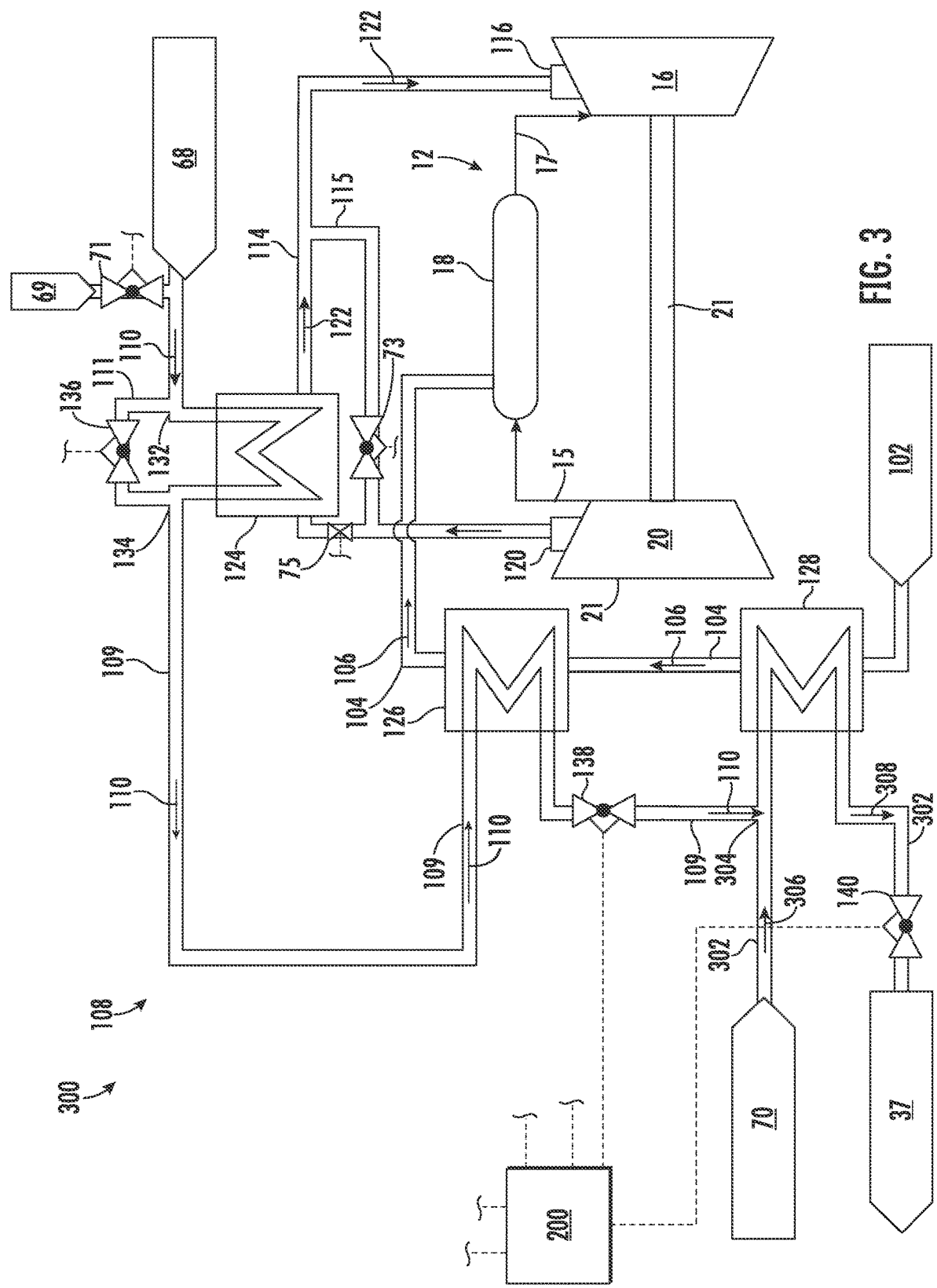
FIG. 3 illustrates a schematic view of a gas turbine system, in accordance with embodiments of the present disclosure.

One aspect of CCPP 10 disclosed herein is utilizing the high-temperature water (or steam in some instances) from the HRSG 32 to improve the overall efficiency of the gas turbine 12 in a gas turbine system 100, thereby increasing the efficiency of the overall CCPP 10. For example, in exemplary embodiments, as shown in FIG. 1, a first feed water supply line 68 may extends from an outlet of the HPECON 48, out of the HRSG 32, and may be fluidly coupled to a water circuit 108 of a gas turbine system 100 (FIGS. 2 and 3). Additionally or alternatively, in other embodiments (not shown), the feed water supply line may extend from an outlet of the IPECON 44 and/or the LPECON and may be fluidly coupled to the water circuit 108. In particular, the first feed water supply line 68 may provide a first flow of water 110 at a first pressure and a first temperature to a water circuit 108 for use in a gas turbine system 100 (FIGS. 2 and 3). The first flow of water 110 may be used in one or more heat exchangers, in order to both cool compressor extraction-air and heat fuel. Similarly, a second feed water supply line 70 may extend from the outlet of the IPECON 44, out of the HRSG 32, and may be fluidly coupled to the water circuit 108 of a gas turbine system 100 (FIGS. 2 and 3). In particular, the second feed water supply line 70 may provide a second flow of water 306 at a second pressure and second temperature to the water circuit 108 for use in the gas turbine system 100 (FIGS. 2 and 3). In many embodiments, the second flow of water 306 may be a different temperature and pressure than the first flow of water 110. The second flow of water 306 may be used in one or more heat exchangers, in order to further heat fuel prior to entrance into the combustion section 18.

In some embodiments (not shown), a third feed water supply line may extend from the LPECON 40 in the same manner as the first and second feed water supply lines 68, 70. The third feed water supply line may also be coupled to the water circuit 108 and may provide a third flow of water at a third temperature and pressure to the water circuit 108, which may be different than the first and the second flows of water 110, 306.

FIG. 2 illustrates a schematic of an exemplary gas turbine system 100, in accordance with embodiments of the present disclosure. As shown, the gas turbine systems 100 includes a gas turbine 12 having a compressor section 20, a turbine section 16, and a combustor section 18. The combustor section 18 is disposed downstream from the compressor section 20 and upstream from the turbine section 16 with respect to the flow of compressed air 15 and/or combustion gases 17 within the gas turbine 12.

the combustor section 18 may be in fluid communication with a fuel supply 102 via a fuel supply line 104. For example, the combustion section 18 may receive a flow of fuel 106 (such as gaseous fuel and/or liquid fuel) from the fuel supply line 104 and compressed air 15 from the compressor section 20, which are mixed together and burned within the combustion section 18 to produce combustion gases 17 that power the turbine section 16. As may be appreciated, preheating the flow of fuel 106 prior to entrance into the combustion section 18 results a lower fuel mass flowrate of the fuel 106, thereby increasing the efficiency of the turbine section 16 and the overall gas turbine system 100. As used herein, the term "line" may refer to a hose, piping, and/or tube that is used for carrying fluid(s).

The gas turbine system 100 may further include an extraction-air line 114 that extends between an inlet port 120 on the compressor section 20 and an outlet port 116 on the turbine section 16. Alternatively or additionally, the extraction-air line 114 may extend directly from the outlet of the compressor section 20, such that the extraction-air 122 is at the maximum operating pressure. In some embodiments, the outlet port 116 may be coupled to the shaft 21 or/and to components in turbine section 16, such that a flow of extraction—122 may be used for cooling the shaft 21 or/and to components in turbine 16, or one or more components within gas turbine 12. In exemplary embodiments, the extraction-air line 114 may provide a flow of extraction-air 122 from the compressor section 20 to the turbine section 16, in order to cool various hot gas path components of the turbine section 16 (such as the gas turbine rotor, turbine rotor blades, stator vanes, or other hot gas path components). As should be appreciated, the cooler the extraction-air 122 (and the higher the pressure), the more effective it will be at cooling the various hot gas path components of the turbine section 16.

The inlet port 120 of the extraction-air line 114 may be disposed along an outer casing of the compressor section 20. In many embodiments, the inlet port 120 may be in fluid communication with one or more stages (not shown) of the compressor section 20. Depending on the desired pressure and/or temperature of the flow of extraction-air 122, the inlet port 120 may be in fluid communication with earlier or later stages of the compressor section 20. For example, in varying embodiments, the inlet port 120 may be biased or positioned closer to an inlet 23 of the compressor section 20 to extract a lower pressure and cooler flow of extraction-air 122, or the inlet port 120 may be biased or positioned closer to the combustion section 18 for a flow of extraction-air 122 at a relatively higher pressure and temperature.

As shown in FIGS. 2 and 3, the extraction-air line 114 may further include a bypass line 115, a control valve 73 disposed on the bypass line 115, and a control valve 75 disposed on the extraction-air line. The bypass line 115 may extend between an inlet and an outlet each defined on the extraction-air line 114 on either side of the first heat exchanger 124. The control valve 73 may be disposed on the bypass line 115 and may be operable to selectively restrict the flow through the bypass line 115. Likewise, the control valve 75 may be disposed on the extraction-air line 114 (e.g. downstream from the inlet of the bypass line 115 and upstream from the first heat exchanger 124) and may be operable to selectively restrict the flow of air through the extraction-air line 114. Both of the control valves 73 and 75 may be actuatable between a fully open position, in which the flow of air therethrough is unrestricted, and a fully closed position, in which the flow of air therethrough is fully restricted. In this way, the control valves 73, 75 and the bypass line 115 advantageously provide a means for the extraction-air 122 to bypass the first heat exchanger 124 if necessary. For example, opening the control valve 73 and closing the control valve 75 would route all of the extraction-air 122 through the bypass line 115, thereby allowing for the first heat exchanger 124 to be bypassed if necessary.

In exemplary embodiments, the gas turbine system 100 may further include a water circuit 108 fluidly coupled to and extending between the first feed water supply line 68, a cooling water supply line 69, and a return water line 37. In exemplary embodiments, the water circuit 108 may be fluidly coupled to the HRSG 32 of the combined cycle power plant 10. For example, As shown in FIGS. 1 and 2 collectively, the first feed water supply line 68 may fluidly extend from an outlet of the HPECON 48 to the water circuit 108. In such embodiments, the return water line 37 may fluidly extend from the water circuit 108 and the condenser 36. Alternatively or additionally, the return water line 37 may fluidly couple to a main condensate line 41 downstream of the condensate pump 38 (e.g. between the condensate pump 38 and the LPECON 40 in FIG. 1). As used herein, "to fluidly extend from a first component to a second component" may refer to a line, pipe, or hose that extends from a first component to a second component and is in fluid communication with both the first and the second components.

In various embodiments, the cooling water supply line 69 may extend from the pump 39 and may be operable to supply a flow of water to the water circuit 108 from the LPEVAP 42. The water from the cooling water supply line 69 may be at a lower temperature than the water being delivered from the first water supply line 68 and may be used for controlling the temperature of the water 110 introduced into the water circuit 108. For example, a control valve 71 may control the amount of cooling water delivered to the water circuit 108. The cooling water supply line 69 and the control valve 71 advantageously ensure that the water 110 delivered to the first heat exchanger 124 remains below the saturation temperature (e.g. below the boiling point), thereby preventing the generation of steam in the first heat exchanger 124.

In other embodiments, the gas turbine system 100 shown in FIG. 2 may be a standalone system, such that the system 100 is not coupled to the CCPP 10 shown in FIG. 1. In such embodiments, the first feed water supply line 68 may be coupled to an independent feed water supply, and the return water line 37 may be coupled to an independent water return tank or condenser.

As shown in FIG. 2, the water circuit 108 may include a first water line 109 extending between the first feed water supply line 68 and the return water line 37. As shown, a first flow of water 110 may flow from the first feed water supply 68, through one or more heat exchangers 124, 126, to the return water line 37. In particular embodiments, in which the gas turbine system 100 is implemented into the CCPP 10 shown in FIG. 1 and described above, the first water line 109 may extend continuously from the outlet of the HPEVAP 48 to the condenser 36, such that the first feed water supply line 68, the first water line 109, and the return water line 37 are one continuous circuit with the CCPP 10.

In exemplary embodiments, the gas turbine system 100 may further include a first heat exchanger 124 that thermally couples the first water line 109 to the extraction-air line 114 for transferring heat from the flow of extraction-air 122 within the extraction-air line 114 to the first flow of water 110 within the water circuit 108. For example, both the extraction-air line 114 and the first water line 109 may extend through the first heat exchanger 124, in order for heat to be transferred from the extraction-air 122 to the first flow of water 110. In this way the temperature of the first flow of water 110 may be increased when exiting the first heat exchanger 124 and the temperature of the extraction-air 122 may be decreased when exiting the first heat exchanger 124. This exchange of heat may be advantageous because it allows the extraction-air 122 to more effectively cool the hot gas path components of the turbine section 16 and allows the flow of water 110 to more effectively preheat the fuel 106.

In various embodiments, the first flow of water 110 may have a temperature of between about 650° F. (approximately 345° C.) and about 670° F. (approximately 355° C.) when entering the first heat exchanger 124. Upon exiting the first heat exchanger 124, the first flow of water 110 may have a temperature of between about 680° F. (approximately 360° C.) and about 700° F. (approximately 370° C.). This may be an improvement over prior designs, as the first flow of water 110 increases temperature before being used for fuel preheating. For example, the first heat exchanger 124 may increase the temperature of the water 110 by between about 1% and about 10%. In other embodiments, the first heat exchanger 124 may increase the temperature of the water 110 by between about 1% and about 5%. In specific embodiments, the first heat exchanger 124 may increase the temperature of the water 110 by between about 1% and about 3%.

In particular embodiments, the first heat exchanger 124 may be coupled to both the first water line 109 and the extraction-air line 114. For example, the first heat exchanger 124 may be disposed on the first water line 109 downstream from the first feed water supply line 68 with respect to the first flow of water 110, such that the first flow of water 110 travels out of the HPECON 48, through at least a portion of the lines 68, 109, and into the first heat exchanger 124. In some embodiments, the second heat exchanger 126 may be disposed immediately downstream from the first heat exchanger 124 with respect to the first flow of water 110. In particular embodiments, all of the first flow of water 110 flows through the first heat exchanger 124.

In many embodiments, as shown, the first heat exchanger 124 may be disposed on the extraction-air line 114 at a location between the inlet port 120 and the outlet port 116. In particular embodiments, the first heat exchanger 124 may be disposed on the extraction-air line 114 immediately downstream from the inlet port 120 and immediately upstream from the outlet port 116 with respect to the flow of extraction-air 122. In this way, all of the extraction-air 122 may flow through the first heat exchanger 124.

The gas turbine system 100 may further include a second heat exchanger 126 that thermally couples the first water line 109 to the fuel supply line 104 for transferring heat from the first flow of water 110 within the water circuit 108 to the flow of fuel 106 within the fuel supply line 104. For example, both the first water line 109 and the fuel supply line 104 may extend through the second heat exchanger 126, in order for heat to be transferred from the first flow of water 110 to the flow of fuel 106. In this way, the temperature of the flow of fuel 106 may be increased when exiting the second heat exchanger 126, and the temperature of the first flow of water 110 may be decreased when exiting the second heat exchanger 126.

In specific embodiments, the first flow of water 110 may have a temperature of between about 680° F. (approximately 360° C.) and about 700° F. (approximately 370° C.) when entering the second heat exchanger 126. Upon exiting the second heat exchanger 126, the first flow of water 110 may have a temperature of about 450° F. (approximately 230 C) and about 520° F. (approximately 270° C.). This may be an improvement over prior designs, as the first flow of water 110 has an increased temperature due to the first heat exchanger 124 being positioned upstream.

The second heat exchanger 126 may be coupled to both the first water line 109 and the fuel supply line 104. For example, the second heat exchanger 126 may be disposed on the first water line 109 downstream from the first heat exchanger 124 with respect to the flow of water 110 within the first water line 109. More specifically, the second heat exchanger 126 may be immediately downstream from the first heat exchanger 124 with respect to the flow of water 110, such that the water 110 exits the first heat exchanger 124, travels through a portion of the first water line 109, and enters the second heat exchanger 126.

In optional embodiments, the water circuit 108 may include a bypass line 111 and one or more valves 136, 138, 140. The bypass line 111 may extend between an inlet 132 and an outlet 134, each fluidly coupled to the first water line 109 at two different locations. For example, the inlet 132 of the bypass line 111 may be fluidly coupled to the first water line 109 immediately upstream from the second heat exchanger 126, and the outlet 134 of the bypass line 111 may fluidly couple to the first water line 109 immediately downstream from the second heat exchanger 126.

The one or more valves 136, 138, 140 may include a bypass valve 136, a first water line valve 138, and a second water line valve 140 (FIG. 3). The bypass valve 136 may be disposed on, and in fluid communication with, the bypass line 111 immediately downstream from the inlet 132 of the bypass line 111. The first water line valve 138 may be positioned on, and in fluid communication with, the first water line 109 immediately downstream of the second heat exchanger 126. The second water line valve 140 may be positioned immediately upstream from the return water line 37, such that actuating the second water line valve 140 between a fully open and fully closed position controls the amount of water passing through the third heat exchanger 128.

The bypass valve 136 may be selectively actuated (e.g. between a fully open position and a fully closed position) to control the amount of water 110 that flows through the first heat exchanger 124. In this way, the bypass valve 136 may be operable to control how much heat is transferred from the extraction-air 122 by actuating the bypass valve 136 thereby changing the mass flow rate through the first heat exchanger 124.

Similarly, the first water line valve 138 may be selectively actuated (e.g. between a fully open position and a fully closed position) to control the amount of water 110 that flows through the second heat exchanger 126. In this way, the first water line valve 138 may be operable to control how much heat is transferred to the fuel 106 by actuating the first water line valve 138 thereby changing the mass flow rate through the heat exchanger 126.

In exemplary embodiments, the valves described herein (such as the valves 71, 73, 75, 136, 138, 140) may each be selectively actuated between an open position and a closed position by a controller 200. For example, when the valves 71, 73, 75, 136, 138, 140 are in a closed position, the flow of fluid therethrough is restricted or otherwise prevented. In particular, one or more of the valves 71, 73, 75, 136, 138, 140 may be control valves, such that they are operable to control fluid flow by varying the size of the flow passage as directed by a signal from a controller 200. In such embodiments, the valves 71, 73, 75, 136, 138, 140 may be operable to partially restrict the flow of fluid therethrough. For example, the controller 200 can operate the various valves 71, 73, 75, 136, 138, 140 of the gas turbine system 100. In particular, the controller 200 may be operably coupled (e.g., in electrical or wireless communication) with each of the valves, e.g., the control valve 71, the control valve 73, the control valve 75, the bypass valve 136, the first water line valve 138, and the second water line valve 140. Thus, the controller 200 can selectively actuate and operate said valves 71, 73, 75, 136, 138, 140.

FIG. 3 illustrates a schematic of another exemplary embodiment of a gas turbine system 300, in accordance with embodiments of the present disclosure. As shown, a second feed water supply line 70 may be fluidly coupled to the water circuit 108, such that the water circuit 108 is fluidly coupled to, and extending between, the first feed water supply line 68, the second feed water supply line 70, and the return water line 37. In exemplary embodiments, the water circuit 108 may be fluidly coupled to the HRSG 32 of the combined cycle power plant 10. For example, As shown in FIGS. 1 and 2 collectively, the first feed water supply line 68 may fluidly extend from an outlet of the HPECON 48 to the water circuit 108. Similarly, the second feed water supply line 70 may fluidly extend from an outlet of the IPECON 44 to the water circuit 108. In such embodiments, the return water line 37 may fluidly extend from the water circuit 108 to the condenser 36.

In other embodiments, the gas turbine system 300 shown in FIG. 3 may be a standalone system, such that the system 300 is not coupled to the CCPP 10 shown in FIG. 1. In such embodiments, the first feed water supply line 68 may be coupled to a first independent feed water supply (such as a pressurized storage tank), the second feed water supply line 70 may be coupled to a second independent feed water supply (such as a pressurized storage tank), and the return water line 37 may be coupled to an independent water return tank or condenser.

In the embodiment shown in FIG. 3, the gas turbine system 300 may include a second water line 302 that extends between the second feed water supply line 70 and the return water line 37. In such embodiments, an outlet 304 of the first water line 109 may be fluidly coupled to the second water line 302 downstream from (e.g. immediately downstream from) the second feed water supply line 70. In other embodiments (not shown), the first water line 109 and the second water supply line 302 may be fluidly isolated from one another, such that they separately fluidly couple to the return water line 37.

As shown in FIG. 3, the second feed water supply line 70 may supply a second flow of water 306 (e.g. from the outlet of the IPECON 44 shown in FIG. 1) at a second temperature and second pressure. Upon exiting the feed water supply line 70, the second flow of water 306 may be a different temperature and pressure than the first flow of water 110 is when exiting the first feed water supply line 68. For example, the first flow of water 110 may be at a higher temperature and pressure than the second flow of water 306 upon exiting the respective feed water supplies 68, 70. As shown in FIG. 3, the first flow of water 110 and the second flow of water 306 may mix together at the outlet 304 of the first water line 109 to form a third flow of water 308.

In exemplary embodiments, as shown in FIG. 3, a third heat exchanger 128 may thermally couple the second water line 302 to the fuel supply line 104 for transferring heat from the water to the fuel. For example, both the second water line 302 and the fuel supply line 104 may extend through the third heat exchanger 128, in order for heat to be transferred from the third flow of water 308 to the flow of fuel 106. In this way, the temperature of the flow of fuel 106 may be increased when exiting the third heat exchanger 128, and the temperature of the third flow of water 110 may be decreased when exiting the third heat exchanger 128.

In specific embodiments, the third flow of water 308 may have a temperature of between about 450° F. (approximately 230° C.) and about 500° F. (approximately 260° C.) when entering the third heat exchanger 128. Upon exiting the second heat exchanger 126, the first flow of water 110 may have a temperature of about 120° F. (approximately 50° C.) and about 160° F. (approximately 70° C.). This may be an improvement over prior designs, as the third flow of water 308 has an increased temperature due to the first heat exchanger 124 being positioned upstream (due to the first heat exchanger extracting heat energy from the extraction-air 122).

As shown in FIG. 3, the third heat exchanger 128 may be disposed downstream from the first and the second heat exchangers 124, 126 with respect to the flow of water through the water circuit 108. For example, the third heat exchanger 128 may be disposed immediately downstream from the outlet 304 of the first water line 109 and immediately upstream from the return water line 37. In the embodiment shown in FIG. 3, the second water line valve 140 may be positioned on the second water line 302. Further, the third heat exchanger 128 may be positioned upstream from the second heat exchanger 126 with respect to the flow of fuel 106 in the fuel supply line 104. In this way, the third heat exchanger 128 may be the downstream-most heat exchanger coupled to the water circuit 108 with respect to the flow of water therethrough, and the third heat exchanger 128 may be the upstream-most heat exchanger coupled to the fuel supply line 104 with respect to the flow of fuel 106 therethrough.

In the embodiments shown in FIGS. 1-3, the water circuit 108, the fuel supply line 104, and the extraction-air 114 may each be fluidly isolated from one another but may be in thermal communication with one another via the various heat exchangers 124, 126, 128. For example, the heat exchangers 124, 126, 128 described herein may transfer heat between the various fluids without having the fluids physically contact each other. In particular, the heat exchangers 124, 126, 128 described herein may be parallel-flow and/or counter-flow heat exchanger, a finned and/or unfinned tubular heat exchanger, a plate-and-frame heat exchanger, a plate-fin heat exchanger, a microchannel heat exchanger, or other suitable type of heat exchangers.

In operation, the gas turbine systems 100, 300 and the positioning of the heat exchangers 124, 126, 128 described herein may advantageously provide increased operating efficiency for the overall combined cycle power plant 10. For example, the heat exchangers 124, 126, 128 may advantageously cool the extraction-air 122 and preheat the fuel 106, which provides increased efficiency for the gas turbine 12 and the CCPP 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A gas turbine system comprising a gas turbine having a compressor section, a turbine section, and a combustor section disposed downstream from the compressor section and upstream from the turbine section, the combustor section in fluid communication with a fuel supply via a fuel supply line; a water circuit fluidly coupled to and extending between a first feed water supply line and a return water line, the water circuit comprising a first water line extending between the first feed water supply line and the return water line; an extraction-air line extending between an inlet port on the compressor section and an outlet port; a first heat exchanger thermally coupling the first water line to the extraction-air line for transferring heat from a flow of extraction-air within the extraction-air line to a flow of water within the water circuit; and a second heat exchanger thermally coupling the first water line to the fuel supply line for transferring heat from the flow of water within the water circuit to a flow of fuel within the fuel supply line.

The gas turbine system of one or more of these clauses, wherein the second heat exchanger is disposed downstream from the first heat exchanger with respect to the flow water within the water circuit.

The gas turbine system of one or more of these clauses, further comprising a cooling water supply line fluidly coupled to the water circuit upstream of the first heat exchanger with respect to the flow of water.

The gas turbine system of one or more of these clauses, wherein the water circuit further comprises a second feed water supply line fluidly coupled to the water circuit upstream of the return water line.

The gas turbine system of one or more of these clauses, wherein a second water line extends between the second feed water supply line and the return water line.

The gas turbine system of one or more of these clauses, wherein a third heat exchanger thermally couples the water circuit to the fuel supply line for transferring heat from the water to the fuel.

The gas turbine system of one or more of these clauses, wherein the first water line is fluidly coupled to the second water line upstream from the third heat exchanger with respect to the flow of water within the water circuit.

The gas turbine system of one or more of these clauses, wherein the third heat exchanger is disposed upstream from the second heat exchanger with respect to the flow of fuel.

The gas turbine system of one or more of these clauses, wherein the water circuit and the extraction-air line each include a bypass line.

The gas turbine system of one or more of these clauses, wherein the water circuit includes one or more valves actuatable between a closed position and an open position by a controller.

A combined cycle power plant (CCPP) comprising a gas turbine system, a steam turbine, and a heat recovery steam generator (HRSG), the HRSG including a high-pressure economizer (HPECON), wherein a first feed water supply line extends from an outlet of the HPECON and out of the HRSG, and wherein the gas turbine system comprises a gas turbine having a compressor section, a turbine section, and a combustor section disposed downstream from the compressor section and upstream from the turbine section, the combustor section in fluid communication with a fuel supply via a fuel supply line; a water circuit fluidly coupled and extending between the first feed water supply line and a return water line, the water circuit comprising a first water line extending between the first feed water supply line and the return water line; an extraction-air line extending between an inlet port on the compressor section and an outlet port on the turbine section; a first heat exchanger thermally coupling the first water line to the extraction-air line transferring heat from a flow of extraction-air within the extraction-air line to a flow of water within the water circuit; and a second heat exchanger thermally coupling the first water line to the fuel supply line for transferring heat from the flow of water within the water circuit to a flow of fuel within the fuel supply line.

The CCPP of one or more of these clauses, wherein the second heat exchanger is disposed downstream from the first heat exchanger with respect to the flow water within the water circuit.

The CCPP of one or more of these clauses, further comprising a cooling water supply line fluidly coupled to the water circuit upstream of the first heat exchanger with respect to the flow of water.

The CCPP of one or more of these clauses, wherein the HRSG further comprises an intermediate-pressure economizer (IPECON), wherein a second feed water supply line extends from an outlet of the IPECON and out of the HRSG, and wherein the second feed water supply line is fluidly coupled to the water circuit upstream of the return water line.

The CCPP of one or more of these clauses, wherein a second water line extends between the second feed water supply line and the return water line.

The CCPP of one or more of these clauses, wherein a third heat exchanger thermally couples the water circuit to the fuel supply line for transferring heat from the water to the fuel.

The CCPP of one or more of these clauses, wherein the first water line is fluidly coupled to the second water line upstream from the third heat exchanger with respect to the flow of water within the water circuit.

The CCPP of one or more of these clauses, wherein the third heat exchanger is disposed upstream from the second heat exchanger with respect to the flow of fuel.

The CCPP of one or more of these clauses, wherein the water circuit and the extraction-air line each include a bypass line.

The CCPP of one or more of these clauses, wherein the water circuit includes one or more valves actuatable between a closed position and an open position by a controller.

What is claimed is:

1. A gas turbine system comprising:
   a gas turbine having a compressor section, a turbine section, and a combustor section disposed downstream from the compressor section and upstream from the turbine section, the combustor section in fluid communication with a fuel supply via a fuel supply line;
   a water circuit fluidly coupled to and extending between a first feed water supply line and a return water line, the water circuit comprising a first water line extending between the first feed water supply line and the return water line;
   an extraction-air line extending between an inlet port on the compressor section and an outlet port;
   a first heat exchanger thermally coupling the first water line to the extraction-air line for transferring heat from a flow of extraction-air within the extraction-air line to a flow of water within the water circuit; and
   a second heat exchanger thermally coupling the first water line to the fuel supply line for transferring heat from the flow of water within the water circuit to a flow of fuel within the fuel supply line, wherein the second heat exchanger is disposed immediately downstream from the first heat exchanger such that all water from the first heat exchanger enters the second heat exchanger.

2. The gas turbine system as in claim 1, further comprising a cooling water supply line fluidly coupled to the water circuit upstream of the first heat exchanger with respect to the flow of water.

3. The gas turbine system as in claim 1, wherein the water circuit further comprises a second feed water supply line fluidly coupled to the water circuit upstream of the return water line.

4. The gas turbine system as in claim 3, wherein a second water line extends between the second feed water supply line and the return water line.

5. The gas turbine system as in claim 4, wherein a third heat exchanger thermally couples the water circuit to the fuel supply line for transferring heat from the flow of water to the fuel.

6. The gas turbine system as in claim 5, wherein the first water line is fluidly coupled to the second water line upstream from the third heat exchanger with respect to the flow of water within the water circuit.

7. The gas turbine system as in claim 5, wherein the third heat exchanger is disposed upstream from the second heat exchanger with respect to the flow of fuel.

8. The gas turbine system as in claim 1, wherein the water circuit and the extraction-air line each include a bypass line.

9. The gas turbine system as in claim 1, wherein the water circuit includes one or more valves actuatable between a closed position and an open position by a controller.

10. A combined cycle power plant (CCPP) comprising:
- a gas turbine system, a steam turbine, and a heat recovery steam generator (HRSG), the HRSG including a high-pressure economizer (HPECON), wherein a first feed water supply line extends from an outlet of the HPECON and out of the HRSG, and wherein the gas turbine system comprises:
- a gas turbine having a compressor section, a turbine section, and a combustor section disposed downstream from the compressor section and upstream from the turbine section, the combustor section in fluid communication with a fuel supply via a fuel supply line;
- a water circuit fluidly coupled and extending between the first feed water supply line and a return water line, the water circuit comprising a first water line extending between the first feed water supply line and the return water line;
- an extraction-air line extending between an inlet port on the compressor section and an outlet port on the turbine section;
- a first heat exchanger thermally coupling the first water line to the extraction-air line transferring heat from a flow of extraction-air within the extraction-air line to a flow of water within the water circuit; and
- a second heat exchanger thermally coupling the first water line to the fuel supply line for transferring heat from the flow of water within the water circuit to a flow of fuel within the fuel supply line, wherein the second heat exchanger is disposed immediately downstream from the first heat exchanger such that all water from the first heat exchanger enters the second heat exchanger.

11. The CCPP as in claim 10, further comprising a cooling water supply line fluidly coupled to the water circuit upstream of the first heat exchanger with respect to the flow of water.

12. The CCPP as in claim 10, wherein the HRSG further comprises an intermediate-pressure economizer (IPECON), wherein a second feed water supply line extends from an outlet of the IPECON and out of the HRSG, and wherein the second feed water supply line is fluidly coupled to the water circuit upstream of the return water line.

13. The CCPP as in claim 12, wherein a second water line extends between the second feed water supply line and the return water line.

14. The CCPP as in claim 13, wherein a third heat exchanger thermally couples the water circuit to the fuel supply line for transferring heat from the flow of water to the fuel.

15. The CCPP as in claim 14, wherein the first water line is fluidly coupled to the second water line upstream from the third heat exchanger with respect to the flow of water within the water circuit.

16. The CCPP as in claim 14, wherein the third heat exchanger is disposed upstream from the second heat exchanger with respect to the flow of fuel.

17. The CCPP as in claim 10, wherein the water circuit and the extraction-air line each include a bypass line.

18. The CCPP as in claim 10, wherein the water circuit includes one or more valves actuatable between a closed position and an open position by a controller.

\* \* \* \* \*